US012270898B2

(12) United States Patent
Chen et al.

(10) Patent No.: US 12,270,898 B2
(45) Date of Patent: Apr. 8, 2025

(54) SMART-DEVICE-BASED RADAR SYSTEM FOR VEHICLE OPERATIONS

(71) Applicant: Google LLC, Mountain View, CA (US)

(72) Inventors: Chih Yu Chen, MiaoLi (TW); YungSheng Chang, Taipei (TW); Ivan Poupyrev, Los Altos, CA (US)

(73) Assignee: Google LLC, Mountain View, CA (US)

( * ) Notice: Subject to any disclaimer, the term of this patent is extended or adjusted under 35 U.S.C. 154(b) by 430 days.

(21) Appl. No.: 17/765,970

(22) PCT Filed: Oct. 17, 2019

(86) PCT No.: PCT/US2019/056722
§ 371 (c)(1),
(2) Date: Apr. 1, 2022

(87) PCT Pub. No.: WO2021/076137
PCT Pub. Date: Apr. 22, 2021

(65) Prior Publication Data
US 2022/0334247 A1    Oct. 20, 2022

(51) Int. Cl.
*G01S 13/931* (2020.01)
*G01S 7/04* (2006.01)
*G01S 13/58* (2006.01)

(52) U.S. Cl.
CPC .............. *G01S 13/931* (2013.01); *G01S 7/04* (2013.01); *G01S 13/582* (2013.01)

(58) Field of Classification Search
CPC ......... G01S 13/931; G01S 7/04; G01S 13/582
See application file for complete search history.

(56) References Cited

U.S. PATENT DOCUMENTS

| 2017/0363738 A1 | 12/2017 | Kaino |
| 2019/0056488 A1* | 2/2019 | Vacanti ..................... G01S 7/06 |
| 2019/0187270 A1 | 6/2019 | Amihood et al. |

(Continued)

FOREIGN PATENT DOCUMENTS

| CN | 1537751 A | 10/2004 |
| CN | 205451514 U | 8/2016 |
| CN | 106405556 A | 2/2017 |

(Continued)

OTHER PUBLICATIONS

"International Preliminary Report on Patentability", Application No. PCT/US2019/056722, Aug. 16, 2021, 13 pages.

(Continued)

*Primary Examiner* — Peter M Bythrow
*Assistant Examiner* — Nazra Nur Waheed
(74) *Attorney, Agent, or Firm* — Colby Nipper PLLC

(57) ABSTRACT

Techniques and apparatuses are described that implement a smart-device-based radar system capable of determining characteristics of objects external to a vehicle, occupants within a vehicle, and objects proximal to an open-air vehicle. In particular, the system enables a smart device to perform many vehicle operations such as collision avoidance, occupant detection, and parking assistance in vehicle and open-air vehicle environments without integrated radar technology. By using a smart device to perform such actions, existing vehicles and open-air vehicles without integrated radar functionality may be able to leverage radar-based vehicle operations.

20 Claims, 10 Drawing Sheets

(56) References Cited

U.S. PATENT DOCUMENTS

2020/0158864 A1* 5/2020 Achour .................. H04W 4/40

FOREIGN PATENT DOCUMENTS

| CN | 109774641 A | 5/2019 | | |
|----|----|----|----|----|
| CN | 110431435 A | 11/2019 | | |
| DE | 102017214009 | 2/2019 | | |
| EP | 3130940 | 2/2017 | | |
| WO | 2012080799 | 6/2012 | | |
| WO | WO-2012080799 A1 * | 6/2012 | .............. | B62J 27/00 |
| WO | 2021076137 | 4/2021 | | |

OTHER PUBLICATIONS

"International Search Report and Written Opinion", Application No. PCT/US2019/056722, Jul. 15, 2020, 17 pages.
"Written Opinion", Application No. PCT/US2019/056722, Dec. 14, 2020, 8 pages.
"Extended European Search Report", EP Application No. 22211940.6, Mar. 9, 2023, 8 pages.
"Foreign Office Action", CN Application No. 201980099845.1, Oct. 31, 2024, 12 pages.
Pfaff, et al., "Neural Network Based Intra Prediction for Video Coding", Mar. 2021, 7 pages.

* cited by examiner

700 ⟶

```
┌─────────────────────────────────────────────────────┐
│ Transmit, from a smart device that is within a       │
│ vehicle, a radar transmit signal through a           │
│ windshield of the vehicle                            │
│ 702                                                  │
└─────────────────────────────────────────────────────┘
                          ↓
┌─────────────────────────────────────────────────────┐
│ Receive an external radar reflection signal through  │
│ the windshield caused by a reflection of the radar   │
│ transmit signal off an object external to the        │
│ vehicle                                              │
│ 704                                                  │
└─────────────────────────────────────────────────────┘
                          ↓
┌─────────────────────────────────────────────────────┐
│ Analyze the external radar reflection signal to      │
│ detect a characteristic of the object                │
│ 706                                                  │
└─────────────────────────────────────────────────────┘
                          ↓
┌─────────────────────────────────────────────────────┐
│ Initiate an operation based on the detected          │
│ characteristic                                       │
│ 708                                                  │
└─────────────────────────────────────────────────────┘
```

FIG. 7

SMART-DEVICE-BASED RADAR SYSTEM FOR VEHICLE OPERATIONS

RELATED APPLICATION(S)

This application is a national stage entry of International Application No. PCT/US2019/056722, filed Oct. 17, 2019, the disclosure of which is incorporated herein by reference in its entirety.

BACKGROUND

Implementation of radar technology in vehicle environments has enabled many forms of enhanced driver experiences and increased vehicle safety. While some vehicle manufacturers are building radar-based systems into their vehicles, these systems are often limited to newer or more-expensive models, which limits access for many vehicle purchasers. Furthermore, while some vehicles may be able to be retrofitted with radar sensors, processors, and displays, integration of such equipment is often expensive, complicated, and time consuming. Accordingly, there exists a need to easily enable larger percentages of drivers to benefit from radar-technology in vehicle environments where the technology either doesn't exist or is lacking in functionality.

SUMMARY

Techniques and apparatuses are described that implement a smart-device-based radar system for vehicle operations. In particular, the system enables a smart device to perform radar-enabled vehicle operations, such as collision avoidance, occupant detection, and parking assistance. By using a smart device to perform such actions, existing vehicle environments (e.g., automobile, truck, motorcycle, boat, plane, bicycle, or open-air vehicle) are able to benefit from radar-based vehicle operations even if those existing vehicles do not have integrated radar-based systems.

Aspects described below include an apparatus for radar-based vehicle operations including a processor and a computer-readable storage media containing instructions that cause the apparatus to transmit a radar transmit signal from the interior of a vehicle via a radar system of the apparatus, receive a radar receive signal comprising a reflection of the radar transmit signal off an object exterior to the vehicle, and initiate an operation based on a characteristic of the object that is determined from the radar receive signal.

Aspects described below also include an apparatus for radar-based vehicle operations including a processor and a computer-readable storage media containing instructions that cause the apparatus to transmit a radar transmit signal through a display screen of the apparatus via a radar system of the apparatus, receive a radar receive signal comprising a reflection of the radar transmit signal off an occupant of a vehicle, and initiate an operation based on a determined activity of the occupant that is determined from the radar receive signal.

Aspects described below also include an apparatus for radar-based vehicle operations including a processor and a computer-readable storage media containing instructions that cause the apparatus to transmit a radar transmit signal while the apparatus is mounted on an open-air vehicle, receive a radar receive signal comprising a reflection of the radar transmit signal off an object within a proximity of the open-air vehicle, and initiate an operation based on a characteristic of the object that is determined from the radar receive signal.

Aspects described below also include a method of performing radar-based vehicle operations where a device transmits a radar transmit signal from the interior of a vehicle via a radar system within the device, receives a radar receive signal comprising a reflection of the radar transmit signal off an object exterior to the vehicle, and initiates an operation based on a characteristic of the object that is determined from the radar receive signal.

Aspects described below also include a method of performing radar-based vehicle operations where a device transmits a radar transmit signal through a display screen of the device via a radar system of the device, receives a radar receive signal comprising a reflection of the radar transmit signal off an occupant of a vehicle, and initiates an operation based on a determined activity of the occupant that is determined from the radar receive signal.

Aspects described below also include a method of performing radar-based vehicle operations where a device transmits a radar transmit signal while the device is mounted on an open-air vehicle, receives a radar receive signal comprising a reflection of the radar transmit signal off an object within a proximity of the open-air vehicle, and initiates an operation based on a characteristic of the object that is determined from the radar receive signal.

Aspects described below include a computer-readable storage media containing instructions that cause a processor to cause a transmission of a radar transmit signal from the interior of a vehicle via a radar system, receive a radar receive signal comprising a reflection of the radar transmit signal off an object exterior to the vehicle via the radar system, and initiate an operation based on a characteristic of the object that is determined from the radar receive signal.

Aspects described below include a computer-readable storage media containing instructions that cause a processor to cause a transmission of a radar transmit signal through a display screen of an apparatus via a radar system of the apparatus, receive a radar receive signal comprising a reflection of the radar transmit signal off an occupant of a vehicle, and initiate an operation based on a determined activity of the occupant that is determined from the radar receive signal.

Aspects described below also include a computer-readable storage media containing instructions that cause a processor to cause a transmission of a radar transmit signal while the apparatus is mounted on an open-air vehicle, receive a radar receive signal comprising a reflection of the radar transmit signal off an object within a proximity of the open-air vehicle, and initiate an operation based on a characteristic of the object that is determined from the radar receive signal.

Aspects described below also include means of transmitting a radar transmit signal from the interior of a vehicle, means of receiving a radar receive signal comprising a reflection of the radar transmit signal off an object exterior to the vehicle, and means of initiating an operation based on a characteristic of the object that is determined from the radar receive signal.

Aspects described below also include means of transmitting a radar transmit signal through a display screen of a device, means of receiving a radar receive signal comprising a reflection of the radar transmit signal off an occupant of a vehicle, and means of initiating an operation based on a determined activity of the occupant that is determined from the radar receive signal.

Aspects described below also include means of transmitting a radar transmit signal while the device is mounted on an open-air vehicle, means of receiving a radar receive signal comprising a reflection of the radar transmit signal off an object within a proximity of the open-air vehicle, and means of initiating an operation based on a characteristic of the object that is determined from the radar receive signal.

Further to the descriptions above and below, a user may be provided with controls allowing the user to make an election as to both if and when systems, programs, or features described herein may enable collection of user information (e.g., information about a user's social network, social actions, social activities, profession, a user's preferences, a user's current location, speed, and heading, information about objects in or around the vehicle, the type of or model of vehicle, number of passengers, types of passengers, or health information about the passengers), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location, speed, or heading may be generalized where location information is obtained (such as to a city, ZIP code, or state level), so that a particular location of a user cannot be determined. Thus, the user may have control over what information is collected about the user, how that information is used, and what information is provided to the user.

BRIEF DESCRIPTION OF THE DRAWINGS

Apparatuses and techniques for implementing a smart-device-based radar system capable of vehicle operations are described with reference to the following drawings. The same numbers are used throughout the drawings to reference like features and components:

FIG. 7 illustrates an example method for performing operations of a smart-device-based radar system capable of detecting information about objects through a windshield of a vehicle.

DETAILED DESCRIPTION

Overview

Radar technology enables many vehicle/driver assistance operations, such as parking assistance, collision avoidance, driver monitoring, autonomous driving, and route guidance in some types of vehicles. In order to perform some of these actions, traditional radar systems are often custom tailored to a vehicle, including radar components that are fixed relative to the vehicle (e.g., a radar sensor mounted in a front bumper). Generally, these traditional systems cannot be implemented in a different environment (e.g., another vehicle) nor can they work effectively if they are moved relative to the vehicle.

Utilizing a smart-device-based radar system to enable radar-enhanced vehicle operations has many challenges, most of which are not encountered in traditional radar implementations. For example, the radar system may need to generate a radar transmit signal able to penetrate a windshield. Furthermore, the system may need to ignore portions of the vehicle within a transmit field of the radar that are not needed for a specific operation (e.g., windshield or internal trim reflections). In some cases, the smart device may need to determine a position of the system relative to the vehicle such that meaningful data can be generated.

Accordingly, devices and techniques described herein present smart-device-based radar systems and methods capable of detecting characteristics of objects external to a vehicle, occupants within a vehicle, and objects proximal an open-air vehicle (e.g., a bicycle or motorcycle). These detected characteristics enable radar-enhanced vehicle operations via a radar-enabled smart device.

Example Environment

Figure 1:
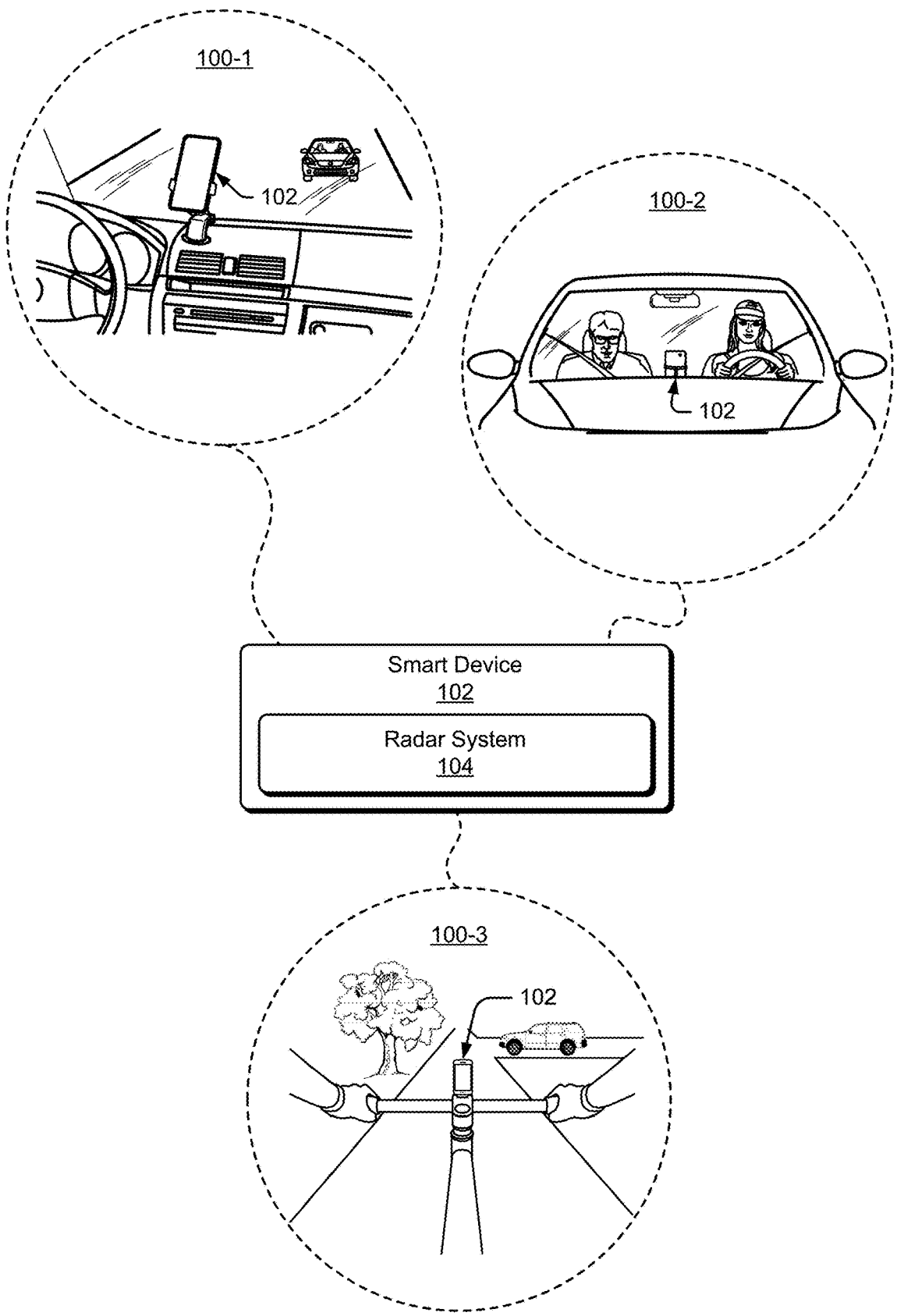
FIG. 1 illustrates example environments in which a smart-device-based radar system capable of vehicle operations can be implemented.

FIG. 1 is an illustration of example environments in which a smart-device-based radar system capable of detecting characteristics of objects external to a vehicle, occupants within a vehicle, and objects proximal an open-air vehicle may be embodied. In the depicted environments 100-1, 100-2, and 100-3, a smart device 102 includes a radar system 104 capable of performing characterization of objects external to a vehicle (100-1), occupants within a vehicle (100-2), and objects proximal an open-air vehicle (100-3). Although the smart device 102 is shown to be a smartphone in FIG. 1, the smart device 102 can be implemented as any suitable computing or electronic device, as described in further detail with respect to FIG. 2.

In the environments 100-1 to 100-3, various characteristics of objects/occupants within transmission fields of the radar system 104 are detected by the radar system 104. For example, the environment 100-1 shows detection of a characteristic of an object external to the vehicle, such as another vehicle approaching. The environment 100-2 shows a detection of a characteristic of an occupant within the vehicle, such as an activity or attention level of a driver. The environment 100-3 shows a detection of a characteristic of an object proximal an open-air vehicle, such as an approaching tree or vehicle.

Some implementations of the radar system 104 are particularly advantageous as applied in the context of the smart devices 102, for which there is a convergence of issues. This can include a need for limitations in a spacing and layout of the radar system 104 and low power. Exemplary overall lateral dimensions of the smart device 102 can be, for example, approximately eight centimeters by approximately fifteen centimeters. Exemplary footprints of the radar system 104 can be even more limited, such as approximately four millimeters by six millimeters with antennas included.

Exemplary power consumption of the radar system 104 may be on the order of a few milliwatts to tens of milliwatts (e.g., between approximately two milliwatts and twenty milliwatts). The requirement of such a limited footprint and power consumption for the radar system 104 enables the smart device 102 to include other desirable features in a space-limited package (e.g., a camera sensor, a fingerprint sensor, a display, and so forth). These features are generally of little concern in traditional radar implementations in vehicle environments. The smart device 102 and the radar system 104 are further described with respect to FIG. 2.

Figure 2:
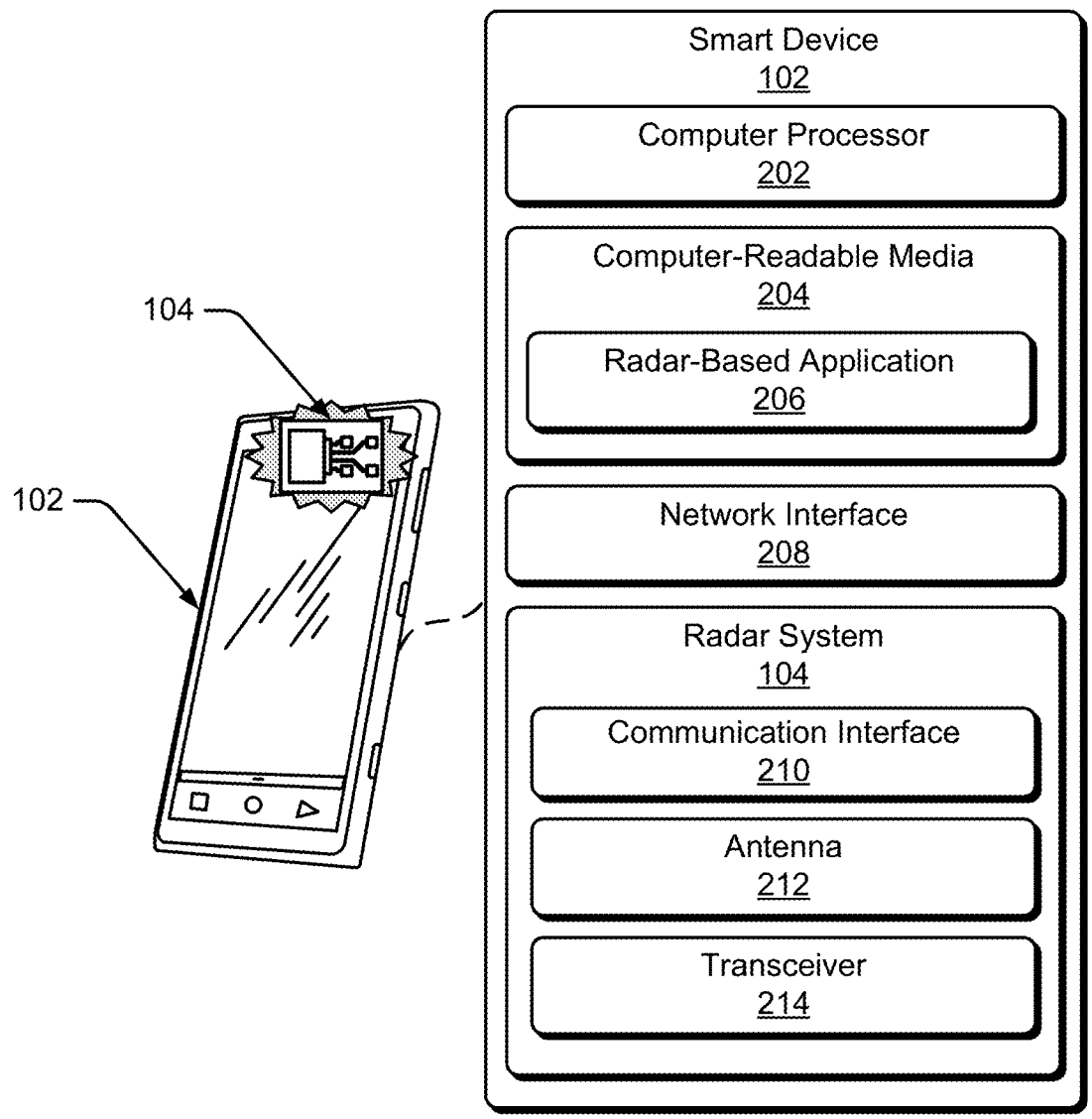
FIG. 2 illustrates an example implementation of a radar system as part of a smart device.

FIG. 2 illustrates the radar system 104 as part of the smart device 102. The smart device 102 can be any suitable computing device or electronic device, e.g., tablet, laptop, smartphone, smart watch, or wearable device. The smart device 102 can be wearable or non-wearable but mobile. The radar system 104 can be used as a stand-alone radar system (e.g., peripheral) or embedded within the smart device 102.

The smart device 102 includes at least one computer processor 202 and at least one non-transitory computer-readable media 204. The computer-readable media 204 includes memory media and storage media. An operating system (not shown) and at least one application, embodied as computer-readable instructions on the computer-readable media 204, can be executed by the computer processor 202 to provide some of the functionalities described herein. For example, the computer-readable media 204 includes at least one radar-based application 206 that uses radar data generated by the radar system 104 to perform functions described herein, such as characterization of objects external to a vehicle, occupants of a vehicle, or objects proximal an open-air vehicle.

The smart device 102 also includes a network interface 208 for communicating data over wired, wireless, or optical networks. For example, the network interface 208 communicates data over a local-area-network (LAN), a wireless local-area-network (WLAN), a personal-area-network (PAN), a wire-area-network (WAN), an intranet, the Internet, a peer-to-peer network, a point-to-point network, a mesh network, and the like. The smart device 102 may also include a display, speakers, or a haptic feedback device (not shown).

The radar system 104 includes a communication interface 210 to transmit the radar data to the smart device 102, though the communication interface 210 may not be needed if the radar system 104 is integrated within the smart device 102. In general, the radar data provided by the communication interface 210 is in a format usable by the radar-based application 206.

The radar system 104 also includes at least one antenna 212 and at least one transceiver 214 to transmit and receive radar signals. The antenna 212 can be circularly polarized, horizontally polarized, or vertically polarized. In some cases, the radar system 104 includes multiple antennas 212 implemented as antenna elements of an antenna array. The antenna array can include at least one transmitting antenna element and at least two receiving antenna elements. In some situations, the antenna array includes multiple transmitting antenna elements to implement a multiple-input multiple-output (MIMO) radar capable of transmitting multiple distinct waveforms at a given time (e.g., a different waveform per transmitting antenna element). The receiving antenna elements can be positioned in a one-dimensional shape (e.g., a line) or a two-dimensional shape (e.g., a triangle, a rectangle, or an L-shape) for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation).

By using an antenna array, the radar system 104 can form beams that are steered or un-steered, wide or narrow, or shaped (e.g., as a hemisphere, cube, fan, cone, or cylinder). By utilizing multiple arrays (e.g., one front facing and one rear facing), a complete sphere may be generated such that the radar system 104 can detect objects in all directions relative to the smart device 102. The transmitting antenna elements may have an un-steered omnidirectional radiation pattern or may be able to produce a wide steerable beam. Either of these techniques enable the radar system 104 to illuminate a large volume of space with radar signals. To achieve target angular accuracies and angular resolutions, the receiving antenna elements can be used to generate thousands of narrow steered beams (e.g., 2000 beams, 4000 beams, or 6000 beams) with digital beamforming. In this way, the radar system 104 can efficiently monitor an external environment and characterize objects.

The transceiver 214 includes circuitry and logic for transmitting and receiving radar signals via the antenna 212. Components of the transceiver 214 can include amplifiers, mixers, switches, analog-to-digital converters, filters, and so forth for conditioning the radar signals. The transceiver 214 also includes logic to perform in-phase/quadrature (I/Q) operations, such as modulation or demodulation. A variety of modulations can be used to produce the radar signals, including linear frequency modulations, triangular frequency modulations, stepped frequency modulations, or phase modulations. The transceiver 214 can be configured to support continuous-wave or pulsed radar operations.

A frequency spectrum (e.g., range of frequencies) that the transceiver 214 can use to generate radar signals can encompass frequencies between 1 and 400 gigahertz (GHz), between 1 and 24 GHz, between 2 and 6 GHz, between 4 and 100 GHz, or between 57 and 63 GHz. In some cases, the frequency spectrum can be divided into multiple sub-spectrums that have similar or different bandwidths. Example bandwidths can be on the order of 500 megahertz (MHz), 1 GHz, 2 GHz, and so forth. Different frequency sub-spectrums may include, for example, frequencies between approximately 57 and 59 GHz, between 59 and 61 GHz, or between 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 104 may also include its own dedicated system processor (not shown) and/or its own dedicated system media (also not shown). The dedicated system processor may be separate from the transceiver 214 or may be implemented within the transceiver 214 as a digital signal processor or a low-power processor, for instance. The dedicated system processor may execute computer-readable instructions that are stored within the dedicated system media or the computer-readable media 204. Example digital operations performed by the dedicated system processor may include Fast-Fourier Transforms (FFTs), filtering, modulations or demodulations, digital signal generation, digital beamforming, and so forth. The radar system 104 is further described with respect to FIG. 3.

Figure 3:
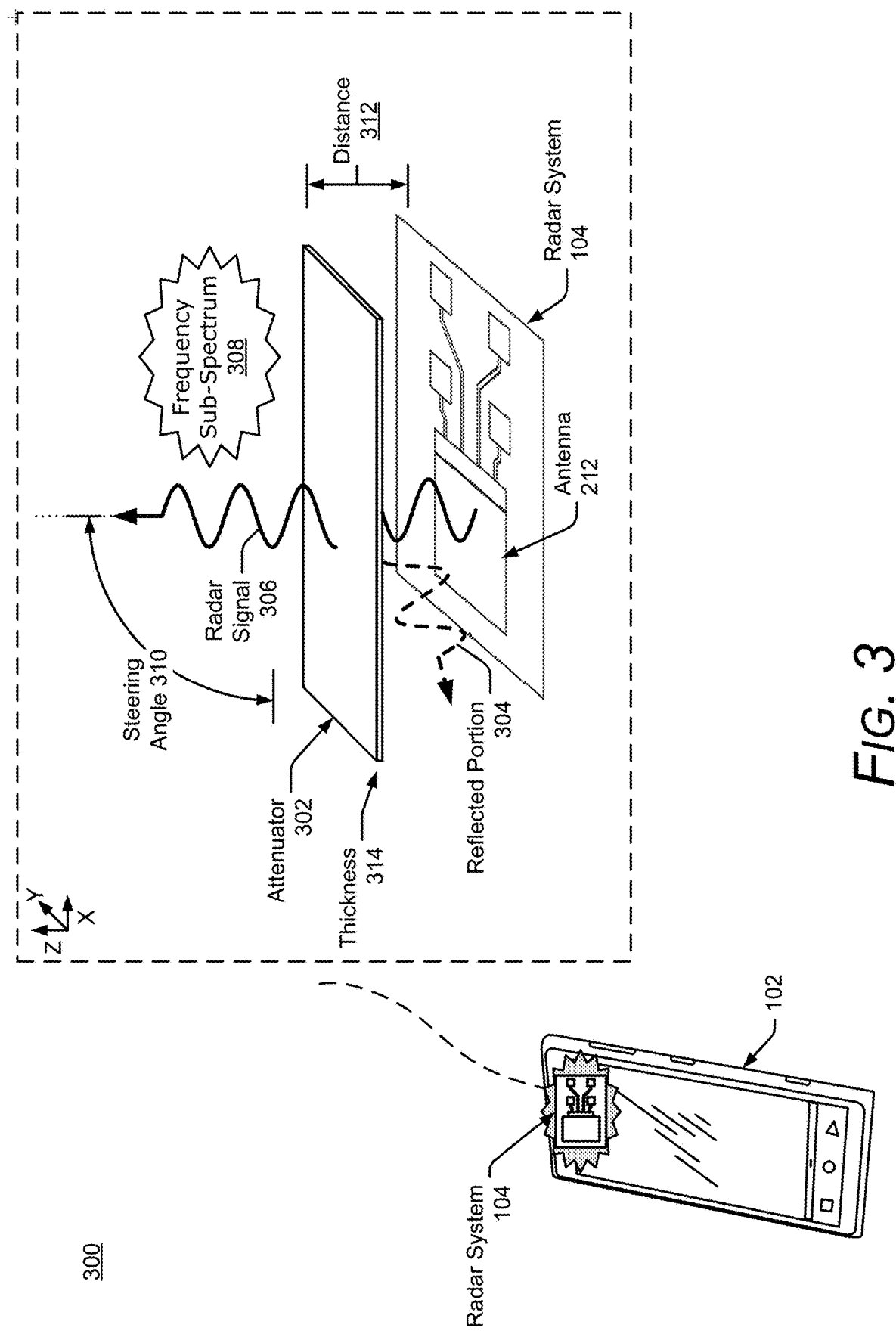
FIG. 3 illustrates an example operation of a radar system for transmission though a display screen of a smart device and/or through a windshield of a vehicle.

FIG. 3 illustrates additional details of an example implementation 300 of the radar system 104 within the smart device 102. In this example, the antenna 212 is positioned underneath an exterior housing of the electronic device 102, such as a glass cover and/or an external case. Furthermore, as discussed below, radar signals transmitted by the antenna 212 may also need to penetrate a windshield or a display screen of the smart device 102. Depending on their material properties, these components may act as attenuators, which attenuate or distort radar signals that are transmitted and received by the radar system 104. The attenuator 302 is representative of any material or combination of materials that transmissions from the antenna 212 may need to penetrate (e.g., exterior housing, case, display screen, and/or windshield). The attenuator 302 may include a variety of materials with corresponding dielectric constants (e.g., relative permissivities) between approximately 4 and 10. Accordingly, the attenuator 302 is opaque or semi-transparent to a radar signal 306 and may cause a portion of the transmitted or received radar signal 306 to be reflected (as shown by a reflected portion 304). For conventional radars, the attenuator 302 may decrease an effective range that can be monitored, prevent small targets from being detected, or reduce overall accuracy.

Assuming a transmit power of the radar system 104 is limited, and re-designing the attenuator 302 is not desirable or possible, one or more attenuation-dependent properties of the radar signal 306 (e.g., a frequency sub-spectrum 308 or a steering angle 310) may be adjusted to mitigate the effects of the attenuator 302. Furthermore, some attenuation-dependent characteristics of portions of the attenuator 302 (e.g., a distance 312 between a component of the attenuator 302 and the radar system 104 or a thickness 314 of a portion of the attenuator 302) may be adjusted to mitigate the effects of the attenuator 302. Some of these characteristics can be set during manufacturing, while some may need to be adjusted by an attenuation mitigator (not shown) during operation of the radar system 104.

The attenuation mitigator, for example, can cause the transceiver 214 to transmit the radar signal 306 using the selected frequency sub-spectrum 308 or the steering angle 310, cause a platform to move the radar system 104 closer or farther from a portion of the attenuator 302 (e.g., effective to change the distance 312), or prompt a user to change an aspect of the attenuator 302 (e.g., effective to change the thickness 314). Appropriate adjustments can be made by the attenuation mitigator based on predetermined characteristics of the attenuator 302 (e.g., characteristics stored within the computer-readable media 204 or the dedicated system memory) or by processing returns of the radar signal 306 to measure one or more characteristics of the attenuator 302. In the case of a vehicle environment, each windshield may have different attenuation properties. Furthermore, different locations of the device 102 relative to a same windshield may cause different attenuation properties. Even if some of the attenuation-dependent characteristics are fixed or constrained, the attenuation mitigator can take these limitations into account to balance each parameter and achieve a desired radar performance. As a result, the attenuation mitigator enables the radar system 104 to realize enhanced accuracy and larger effective ranges for detecting and tracking objects that are located on an opposite side of any objects acting as the attenuator 302 (e.g., case, display screen, and/or windshield). These techniques provide alternatives to increasing transmit power (which may not be possible) and, therefore, power consumption of the radar system 104. These techniques also prevent needing to change material properties of the attenuator 302, which, in the case of the smart device materials, can be difficult and expensive once a device is in production, or in the case of a windshield, near impossible (windshield properties must adhere to various certifications and regulations).

External Object Detection

Figure 4:
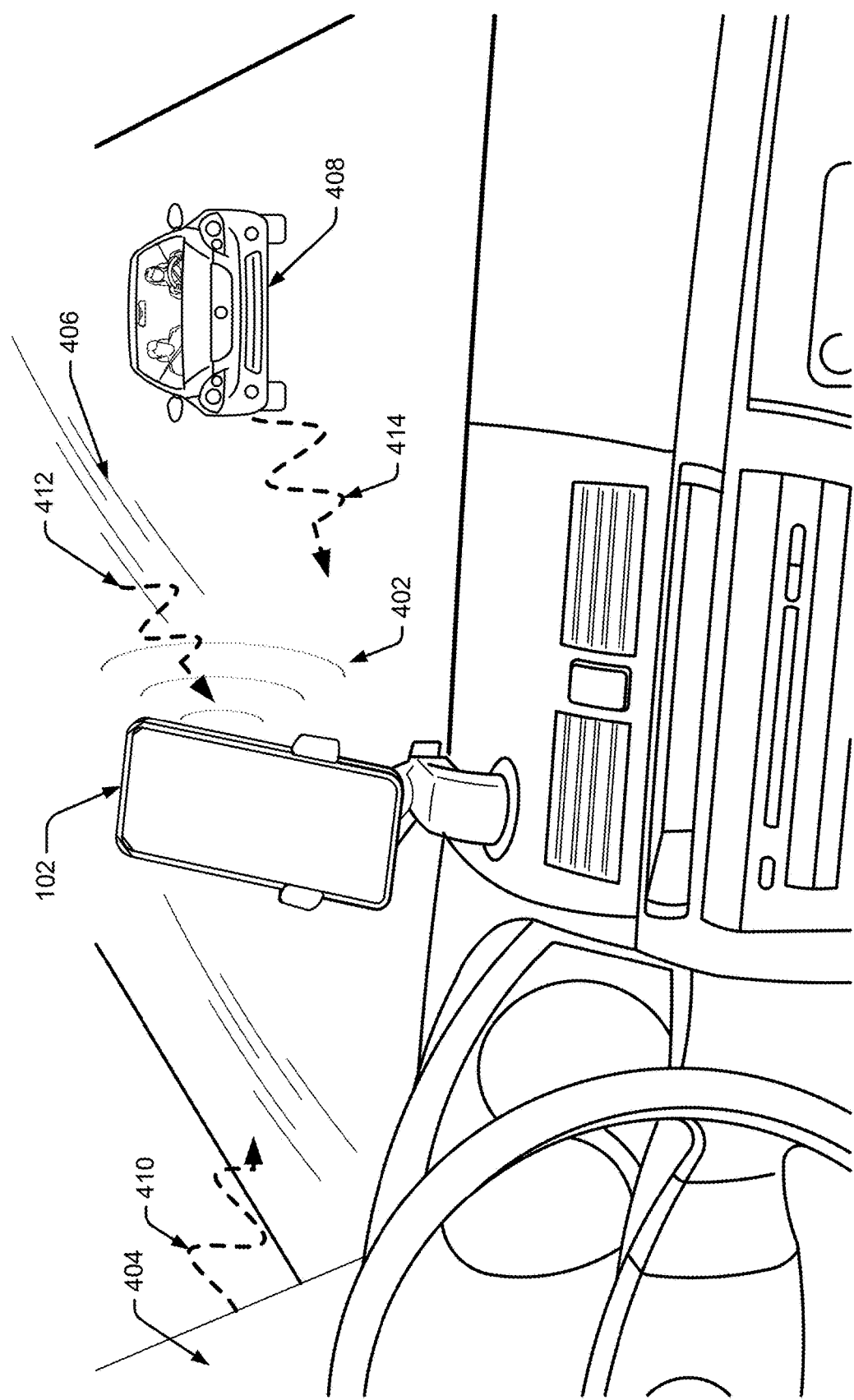
FIG. 4 illustrates an example implementation of a smart-device-based radar system for vehicle operations corresponding to objects external to a vehicle.

FIG. 4 illustrates an example implementation of the smart device 102 for radar-based vehicle operations corresponding to objects external to a vehicle.

During operation, the smart device 102 generates and provides a radar transmit signal 402. As an example, the radar transmit signal 402 is a continuous-wave frequency-modulated signal generated by the radar system 104. The radar transmit signal 402 impinges on both internal objects, e.g., a windshield surround 404, a windshield 406, as well as external objects, e.g., a vehicle 408. Consequently, a radar receive signal may be received that contains radar reflections 410, 412, and 414 caused by reflections of the radar transmit signal 402 off the windshield surround 404, the windshield 406, and the vehicle 408, respectively. Each of the radar reflections 410, 412, and 414 contain at least a portion of the radar transmit signal 402. Internal reflections refer to any radar signals reflected from portions of the vehicle (e.g., the radar reflections 410 and 412). Although radar reflections 410 and 412 have been reflected off portions of the interior of the vehicle, the internal reflections may also come from portions of the exterior of the vehicle, e.g., a side mirror, hood ornament, hood, or quarter-panel. External reflections refer to any radar signals reflected from objects that are not portions of the vehicle (e.g., the radar reflection 414).

Although FIG. 4 shows a single external object (e.g., the vehicle 408), the system may differentiate and track multiple external objects such that operations may be performed based on those determined characteristics of one or more of the external objects, such as collision avoidance and parking assistance. For example, in a parking-assistance operation, extents of vehicles in front and on both sides of the vehicle may be tracked to help avoid a collision. Furthermore, although the smart device 102 is shown as being mounted in a "portrait" orientation and left-of-center on the dash, the following techniques apply to any position and orientation, as long as the objects to be sensed (e.g., the vehicle 408) reflect the radar transmit signal 402 back to the smart device 102 in the given position.

In order to determine characteristics of the external objects, the position of the smart device 102 (position and orientation relative to the vehicle) is calculated. The smart device 102 may analyze the radar receive signal to distinguish the internal reflections (e.g., the radar reflections 410 and 412) from the external reflections (e.g., the radar reflection 414). For example, if the vehicle is moving, internal reflections have a very small relative velocity compared to external reflections. The smart device 102 may then analyze the internal reflections to determine a spatial representation of the interior of the vehicle relative to the smart device 102, e.g., a view of the interior of the vehicle from the perspective of the smart device 102. Based on known characteristics of the vehicle and the spatial representation of the interior of the vehicle relative to the device, the position of the smart device 102 relative to the vehicle device may be determined. The determination may be through a comparison of the spatial representation to the known characteristics, a calculation to known landmarks within the vehicle interior, other distances, and so on.

The known characteristics of the vehicle may include a vehicle map that includes internal as well as external mapping, such that relative locations to exterior extents of the vehicle can be determined based on a known interior location. In one example, a user performs a vehicle set up procedure to map a specific vehicle. In another example, a vehicle spatial map is pulled from a library of vehicle spatial maps. Once the position of the smart device 102 relative to the vehicle is known, extents of the vehicle and directions relative to the vehicle may be determined by the smart device 102.

Other sensors, such as accelerometers, gyroscopes, imagers, and proximity sensors, may be utilized alone or in conjunction with the interior reflections to determine the position of the smart device 102 relative to the vehicle.

In order to maximize detectability of external objects, the internal reflections, such as reflections from the windshield 404, may also be used for attenuation mitigation. For example, the radar reflection 412 may be used to adjust a future outgoing radar transmit signal, as described above in regard to attenuation mitigator. In this way, as the position of the smart device changes relative to the windshield, the radar transmit signal can be adjusted to compensate for the change. Furthermore, the smart device 102 may utilize the position and/or information from the radar reflection 412 to beamform the radar transmit signal 402 in meaningful directions, e.g., forward out the windshield 404.

The smart device may periodically determine its position relative to the vehicle. This periodic determination aids the smart device in updating attenuation mitigation and/or updating its position for external object detection (discussed below). By so doing, the device can be moved within the vehicle without substantial negative effect on the performance of the system.

Certain characteristics of the external objects may be determined without first determining the position of the smart device 102. For example, characteristics such as size, relative velocity, and distance from the smart device 102 to the external objects may be determined without knowing the position of the smart device 102. However, in order to determine directions and distances to the external objects relative to the vehicle, the smart device 102 utilizes the known position of the smart device 102 and known vehicle aspects, as discussed above.

Other characteristics of the external objects may be determined based on the determined position of the smart device 102 relative to the vehicle, and thus, the locations of the extents of the vehicle relative to the smart device 102. Exterior radar reflections (e.g. the radar reflection 414) may be analyzed to determine locations, distances, sizes, identifications, and velocities of the external objects relative to the vehicle. In order to do so, certain characteristics of the objects, e.g., distance and direction, may be compared to distances and directions for the extents of the vehicle (determined above) to determine distances and directions relative to the vehicle. For example, an operator of the vehicle generally wants to know from which direction an object is approaching for the information to be useful. While parking, for example, it is useful to know that an object near the front right corner of the vehicle is "approaching," such that a steering input may be corrected. As the vehicle map contains information about exterior extents of the vehicle (e.g., bumper locations, mirror locations, exterior profile/footprint) and the smart device has already determined the locations of the extents and the locations of the exterior objects, headings and distances to the objects may be determined.

The smart device 102 may then utilize the determined characteristics about the external objects (either with or without the known position of the smart device 102) to perform a function. For example, the function may involve displaying an identification of one or more of the external objects on a display screen of the device along with distances, directions, and/or relative velocities of the objects. The information may be displayed relative to a "surround view" or "driver view" of the vehicle or in relation to some other representation of the vehicle. In some implementations, a warning or notification may be displayed based on a determined characteristic of an external object. For example, if the smart device 102 determines that a collision is imminent, a notification may be presented to alert the driver (visual, audio, haptic, etc.). The smart device 102 may also use onboard sensors as part of the operation. For example, a GPS system may be able to determine a velocity of the vehicle and adjust thresholds for a collision avoidance operation based on the determined velocity of the vehicle. The smart device 102 can also communicate with the vehicle in order to determine velocity, direction, steering input, brake input, throttle input, yaw, pitch, roll, or any other data available at the vehicle.

In terms of a parking assist operation, locations of external objects relative to the vehicle may be displayed. For example, a distance to a car in front of the vehicle may be displayed when parking. Similarly, when pulling into or backing into a perpendicular spot, a distance of a vehicle to the side of the vehicle may be displayed in relation to a corner of the vehicle (e.g., a corner of a front bumper).

The system also enables any number of other radar-based operations based on external objects that are not specifically listed here and would be recognized by one of ordinary skill. As long as an object is able to reflect the radar transmit signal back to the smart device, information about that object can be ascertained and operations performed relative thereto.

Occupant Detection

Figure 5:
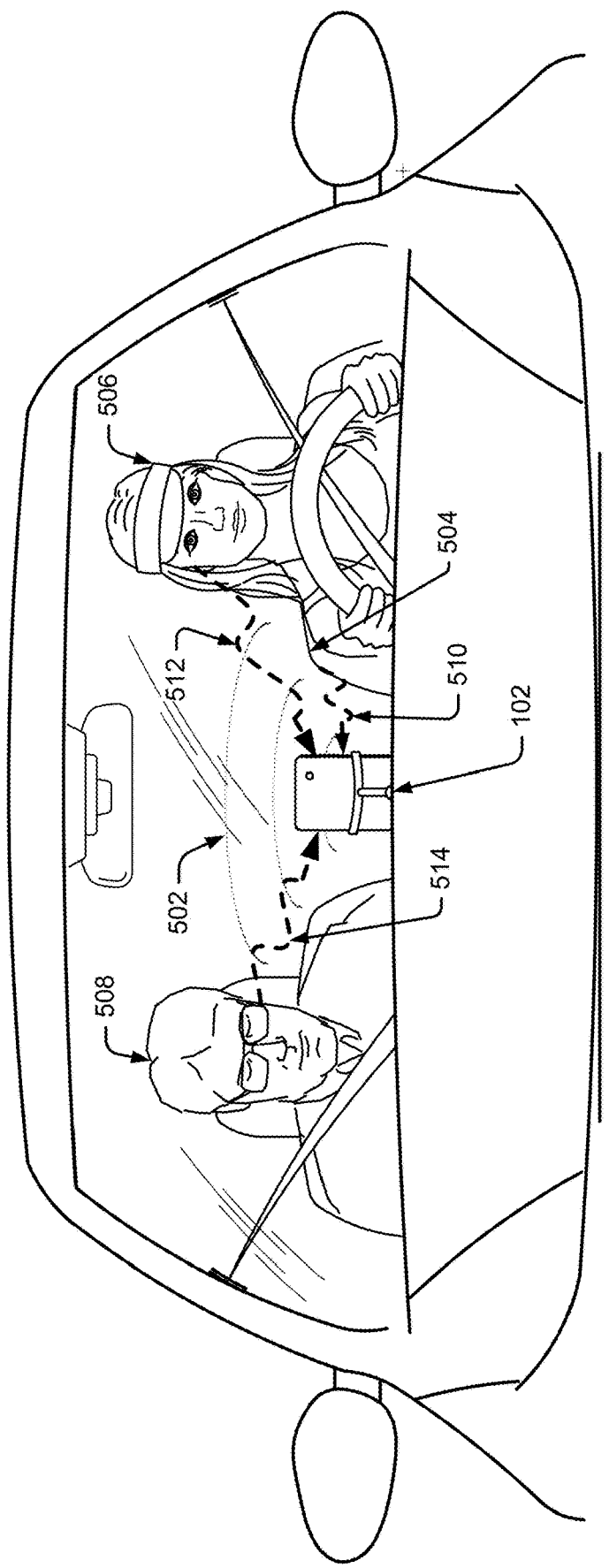
FIG. 5 illustrates an example implementation of a smart-device-based radar system for vehicle operations corresponding to occupants within a vehicle.

FIG. 5 illustrates an example implementation of the smart device 102 for radar-based vehicle operations corresponding to occupants within a vehicle. The following techniques may be utilized in conjunction with the techniques described above in relation to FIG. 4.

During operation, the smart device 102 generates and provides a radar transmit signal 502. As an example, the radar transmit signal 502 is a continuous-wave frequency-modulated signal generated by the radar system 104. The radar transmit signal 502 impinges on both internal objects, e.g., a driver seat 504, as well as occupants, e.g., a driver 506 and a passenger 508. Consequently, a radar receive signal may be received that contains radar reflections 510, 512, and 514 caused by reflections of the radar transmit signal 502 off the driver seat 504, the driver 506, and the passenger 508, respectively. Each of the radar reflections 510, 512, and 514 contain at least a portion of the radar transmit signal 502. Internal reflections refer to any radar reflections coming from portions of the vehicle (e.g., the radar reflection 510). Although radar reflection 510 has been reflected off a portion of the interior of the vehicle, internal reflections may also come from portions of the exterior of the vehicle, e.g., a side mirror, hood ornament, hood, or quarter-panel. Occupant reflections refer to any radar reflections coming from occupants within the vehicle (e.g., the radar reflections 512 and 514).

Although FIG. 5 shows two occupants (the driver 506 and the passenger 508), the smart device 102 can differentiate and determine characteristics for many passengers. Furthermore, similarly to FIG. 4, many positions or orientations of the smart device 102 may be utilized as long as the radar transmit signal 502 is able to be reflected off the occupants (e.g., the driver 506, directly or indirectly from the smart device 102) and received by the smart device 102 in the given position.

Certain characteristics of occupants may be determined without first determining the position of the smart device 102. For example, in some implementations, detecting that an occupant is within a particular distance from a steering wheel may enable the smart device 102 to determine that the occupant is the driver 506. Similarly, movement proximal a car seat would signify that the associated occupant is a child in the back seat. Furthermore, assumptions may be made about occupants, such as when a screen of the smart device 102 is generally pointed towards the back of the vehicle, radar reflections coming from the right would be coming from driver 506 (at least in left-side driver vehicles).

In order to determine certain characteristics of the occupants, the position of the smart device 102 (position and orientation relative to the vehicle) may be calculated. The smart device 102 analyzes the radar receive signal to distinguish the internal reflections (e.g., the radar reflection 510) from occupant reflections (e.g., the radar reflections 512 and 514). For example, objects corresponding to internal reflections will generally not move relative to the smart device 102, however, occupants generally do move. The smart device 102 may then analyze the internal reflections to determine a spatial representation of the interior of the vehicle relative to the smart device 102. Based on known characteristics of the vehicle and the spatial representation of the interior of the vehicle relative to the device, the device may determine the position of the smart device 102 relative to the vehicle.

The known characteristics of the vehicle can include a vehicle map, which includes internal mapping such that relative locations to respective seats of the vehicle may be known based on a known interior location. In one example, a user performs a vehicle set-up procedure to map the interior of a specific vehicle. In another example, a vehicle spatial map is pulled from a library of vehicle spatial maps. In these and other ways, the position of the smart device 102 relative to the vehicle is determined, which enables seat locations and thus occupant differentiation to be performed by the smart device 102.

Other sensors, such as accelerometers, gyroscopes, imagers, and proximity sensors, may be utilized alone or in conjunction with the interior reflections to determine the position of the smart device 102 relative to the vehicle. The smart device 102 may periodically determine its position relative to the vehicle in order to update its position for occupant detection (discussed below). In this way, the smart device 102 may be moved around the interior of the vehicle without negatively affecting the performance of the system.

Certain data about the occupants may be determined responsive to determining the position of the smart device 102 relative to the vehicle. Occupant reflections (e.g. the radar reflections 506 and 508) may be analyzed to determine characteristics about the respective occupants. For example, the system may monitor an attention level of the driver 506 but ignore an attention level of the passenger 508.

The smart device 102 may then utilize the determined characteristics about the occupants to perform a function. For example, if the smart device 102 determines that the driver 506 is falling asleep or not paying attention for a period of time, an alert (visual, audio, haptic, etc.) may be generated. As part of the operation, the smart device 102 may also use onboard sensors or interface with sensors of the vehicle as discussed above. For example, a GPS system may be able to determine a velocity of the vehicle and adjust thresholds for attention-based operations based on the determined velocity of the vehicle.

In another example, the smart device 102 may be able to determine that a child is present in a back seat of the vehicle. As discussed above, the smart device 102 is able to determine that an occupant exists and a location of the occupant relative to the vehicle. By further determining that the occupant is a child in a car seat (based on proximity to a car seat, size, movement, heartbeat, characteristic reflections from tissue, etc.), the smart device 102 may alert the driver 506 of the presence of the child in the car seat if the driver leaves the vehicle (by also tracking the driver or if the driver removes the smart device 102 from the vehicle).

In another example, the smart device 102 can monitor vital signs of one or more of the occupants, e.g., driver 506, passenger 508, child in a car seat, and generate an alert and/or request emergency services if the smart device 102 determines that the services are needed.

Any number of other radar-based operations based on occupants may be performed utilizing the system discussed above. As long as an occupant is able to reflect the radar transmit signal back to the smart device (directly or indirectly), information about that occupant may be ascertained and operations performed relative thereto.

Open-Air Vehicle Operations

Figure 6:
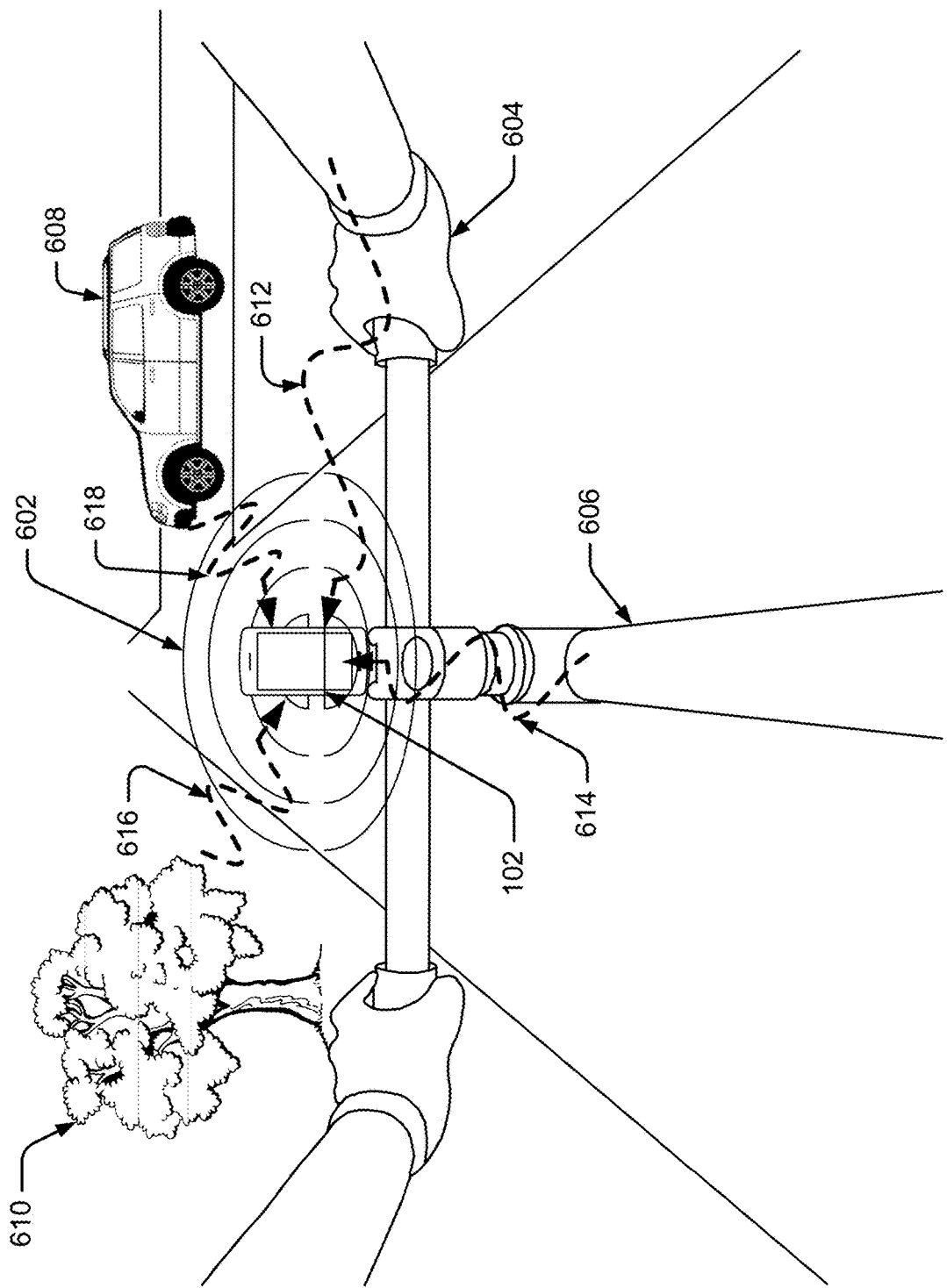
FIG. 6 illustrates an example implementation of a smart-device-based radar system for vehicle operations corresponding to objects within a vicinity of an open-air vehicle.

FIG. 6 illustrates an example implementation of the smart device 102 for radar-based vehicle operations corresponding to objects proximal an open-air vehicle, e.g., a vehicle wherein the extents of the vehicle are either not known or of little concern for vehicle operations. Although a typical bicycle is shown, the following techniques apply to many vehicles, such as recumbent bikes, quad-cycles, all-terrain vehicles, motorcycles with or without windscreens, scooters, mopeds, rickshaws, golf carts, go-carts, e-bikes, and tricycles.

During operation, the smart device 102 generates and provides a radar transmit signal 602. Although, the radar transmit signal 602 is shown as being transmitted both forward and backward, e.g., the spherical beam pattern as discussed above, the smart device 102 may transmit in just a forward or backward direction or some portion thereof. As an example, the radar transmit signal 602 is a continuous-wave frequency-modulated signal generated by the radar system 104. The radar transmit signal 602 impinges on both open-air vehicle objects, e.g., a rider 604 and an open-air vehicle 606 (shown as a bicycle), as well as external objects, e.g., an external vehicle 608 and a tree 610. Consequently, a radar receive signal may be received that contains radar reflections 612, 614, 616, and 618 caused by reflections of the radar transmit signal 602 off the rider 604, the open-air vehicle 606, the external vehicle 608, and the tree 610, respectively. Each of the radar reflections 612, 614, 616, and 618 contain at least a portion of the radar transmit signal 602. Open-air vehicle reflections refer to radar reflections coming from portions of the open-air vehicle 606 or the rider 604 of the open-air vehicle 606 (e.g., the radar reflections 612 and 614). External reflections refer to radar reflections coming from objects that are not portions of the rider 604 or the open-air vehicle 606 (e.g., radar reflections 616 and 618).

In order to determine characteristics of the external objects, the orientation of the smart device 102 relative to the open-air vehicle or a ground plane is calculated. The smart device 102 may analyze the radar receive signal to determine a reflection from the ground. A direction normal to the ground may be determined, which enables a calculation of orientation of the smart device 102. Other sensors, such as accelerometers, gyroscopes, imagers, and proximity sensors, may be utilized alone or in conjunction with reflections to determine the orientation of the smart device 102. The smart device may periodically update its orientation for external object detection (discussed below). This may enable to the smart device 102 to be moved around on the open-air vehicle 606 without negatively affecting the performance.

Certain characteristics of the external objects may be determined without determining the orientation of the smart device 102. For example, aspects of the external objects such as size, relative velocity, and distance to the smart device 102 may be determined without knowing the orientation of the smart device 102, however, directions to the external objects relative to the open-air vehicle are based on the known orientation of the smart device 102, as will be discussed below.

Certain other characteristics about the external objects may be determined based on the determined orientation of the smart device 102, however. Exterior radar reflections (e.g., the radar reflections 616 and 618) may be analyzed using the known orientation to determine locations, directions, distances, sizes, identifications, and velocities of the external objects relative to the open-air vehicle 606. In some implementations, reflections from the rider 604 and the open-air vehicle 606 (e.g., the radar reflections 612 and 614) may be ignored for purposes of the external objects.

The smart device 102 may then utilize the determined information about the external objects (either based on the determined orientation of the smart device 102 or not) to perform a function. For example, the function may involve displaying an identification of one or more of the external objects on a display screen of the smart device 102 with distances, directions, and/or relative velocities of the objects. The information may be displayed relative to a "surround view" or "driver view" of the open-air vehicle or in relation to some other representation of the open-air vehicle. While there are potential radar "blind-spots" caused by the rider 604 or portions of the open-air vehicle 606, the system is still able to track automobiles approaching from the rear when mounted on the handlebars, for example, as the reflections from vehicles are quite strong and generally not completely occluded by the rider 604 or open-air vehicle 606. In some implementations, a warning or notification may be displayed based on a determined characteristic of an external object. For example, if the smart device 102 determines that a collision is imminent, e.g., with the external vehicle 608, a notification may be presented to alert the rider 604. The smart device 102 may use onboard sensors as part of the operation. For example, a GPS system may be able to determine a velocity of the open-air vehicle and adjust thresholds for a collision avoidance operation based on the determined velocity of the open-air vehicle 606.

Other radar-based operations for open-air vehicle operations may be performed utilizing the system discussed above. As long as an object is able to reflect the radar transmit signal back to the smart device, information about that object may be ascertained and operations performed relative thereto.

Example Methods

In portions of the following discussion, reference may be made to the environment 100-1 to 100-3 of FIG. 1, and entities detailed in FIGS. 4-6, reference to which is made for example only. The techniques are not limited to performance by one entity or multiple entities operating on one device. FIGS. 4-6 are shown as sets of operations (or acts) performed but not necessarily limited to the order or combinations in which the operations are shown herein. Further, any of one or more of the operations may be repeated, combined, reorganized, or linked to provide a wide array of additional and/or alternate methods.

FIG. 7 depicts an example method 700 for performing operations of a smart-device-based radar system capable of characterization of objects through a windshield of a vehicle.

At 702, a smart device transmits a radar transmit signal from an interior of a vehicle through a windshield of the vehicle. For example, the smart device 102 may be mounted somewhere on a dash or a pillar of the vehicle such that the radar transmit signal 402 can reach external objects (e.g., the car 408), as shown in FIG. 4. The smart device may adjust the radar transmit signal to penetrate the windshield in an effective manner. For example, a first radar transmit signal may be transmitted in order to determine attenuation caused by the windshield, and the radar transmit signal may be adjusted based on a received reflection of the first radar transmit signal.

At 704, the smart device receives an external radar reflection signal through the windshield caused by a reflection of the radar transmit signal off an object external to the vehicle. For example, the external radar reflection signal may contain a reflection from another vehicle (e.g., reflection 414).

At 706, the external radar reflection signal is analyzed to detect a characteristic of the object. The characteristic may contain an identification of the object, a direction to the object relative to the smart device, a distance between the object and the smart device, or a relative velocity between the object and the smart device. In some implementations, the smart device filters out or otherwise compensates for attenuation caused by the windshield in order to determine the characteristic.

At 708, an operation is initiated based on the detected characteristic of the object. The operation may involve displaying the characteristic on a display screen of the smart device, generating and presenting a notification or warning if the characteristic meets or exceeds certain thresholds, displaying the characteristic along with one or more representations of the vehicle, and so on.

Figure 8:
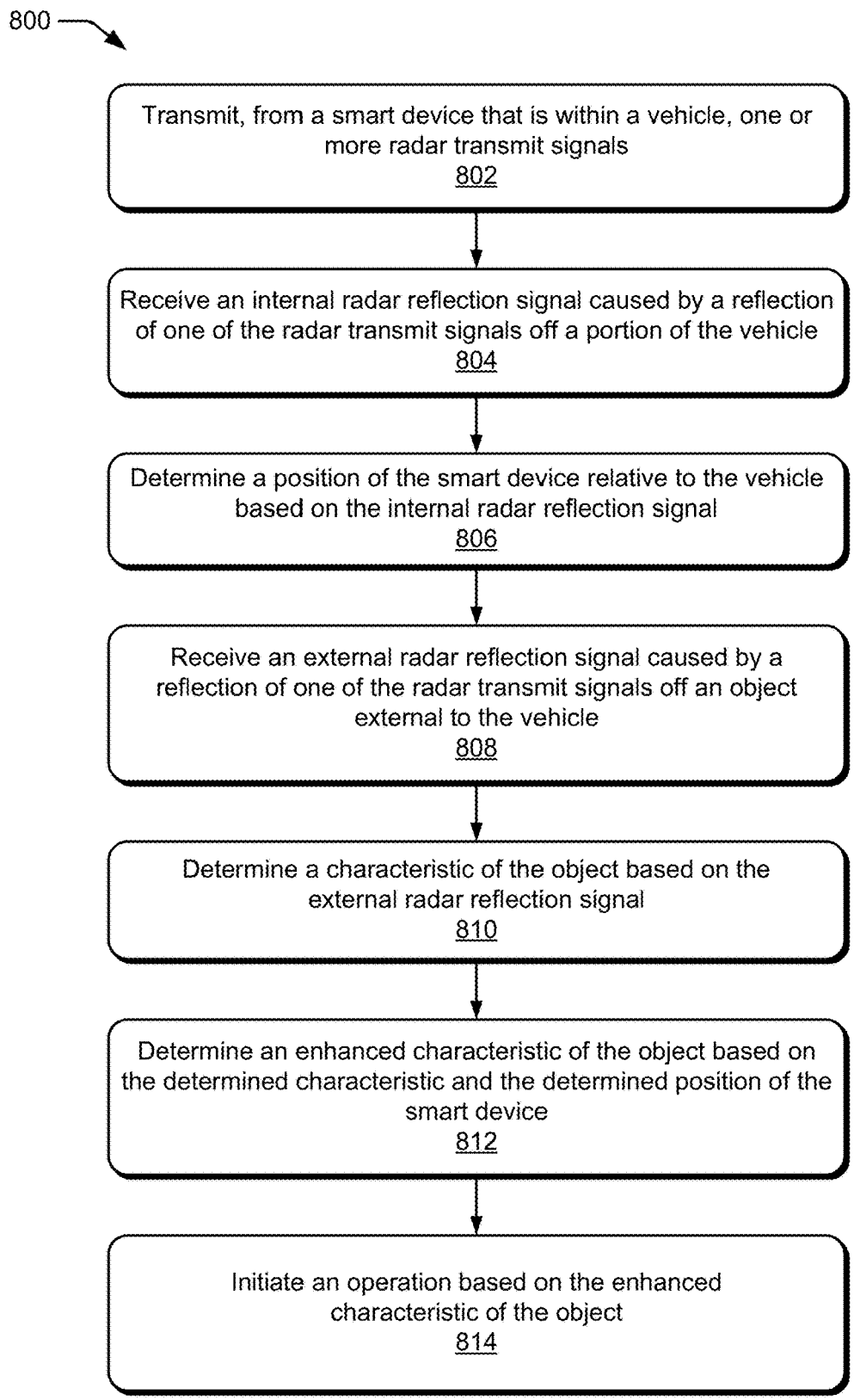
FIG. 8 illustrates an example method for performing operations of a smart-device-based radar system capable of detecting information about objects external to a vehicle.

FIG. 8 depicts an example method 800 for performing operations of a smart-device-based radar system capable of characterization of objects exterior to a vehicle.

At 802, a smart device transmits one or more radar transmit signals from an interior of a vehicle. For example, the smart device 102 may be mounted somewhere on a dash or a pillar of the vehicle such that the radar transmit signal 402 can reach external objects (e.g., the car 408), as shown in FIG. 4.

At 804, the smart device receives an internal radar reflection signal caused by a reflection of one of the radar transmit signals off a portion of the vehicle. For example, the internal radar reflection may be caused by a reflection of a windshield of the vehicle (e.g., reflection 412). In some embodiments, the internal radar reflection signal may come from a portion of the exterior of the vehicle, e.g., a side mirror, hood ornament, hood, or quarter-panel.

At 806, the smart device determines a position of the smart device relative to the vehicle. The position determination may be based on the first reflection portion of the radar receive signal alone or in conjunction with other sensors of the smart device (e.g., accelerometer, inclinometer, or gyroscope). The determination may also utilize a pre-defined vehicle map that is either selected from a library or user created. Furthermore, the position of the smart device may be determined based on another radar receive signal (received prior to the radar receive signal, in parallel with the radar receive signal, or subsequent to the radar receive signal).

At 808, the smart device receives an external radar reflection signal caused by a reflection of one of the radar transmit signals off an object external to the vehicle. The external radar reflection signal may be a reflection of a same radar transmit signal that caused the internal radar reflection signal or a reflection of a different radar transmit signal (e.g., transmitted prior to, after, or based on a different modulation scheme). For example, the external radar reflection signal may be reflected off another vehicle (e.g., reflection 414) and received through the windshield 406.

At 810, the external radar reflection signal is analyzed to detect a characteristic of the object. The characteristic may include an identification of the object, a direction to the object relative to the smart device, a distance between the object and the smart device, or a relative velocity between the smart device and the object.

At 812, an enhanced characteristic of the object is determined based on the determined characteristic along with the determined position of the smart device. The enhanced characteristic of the object may include a distance and/or a heading to the object from an extent of the vehicle. For example, the smart device may determine that the object is 10 meters away, but, because the smart device may be 2 meters from an extent of the vehicle, e.g., a front bumper, the object may only be 8 meters from hitting the vehicle.

At 814, an operation is initiated based on the enhanced characteristic of the object. The operation may involve displaying the enhanced characteristic on a display screen of the smart device, generating and presenting a notification or warning if the enhanced characteristic meets or exceeds certain thresholds, displaying the enhanced characteristic along with one or more representations of the vehicle, and so on.

Figure 9:
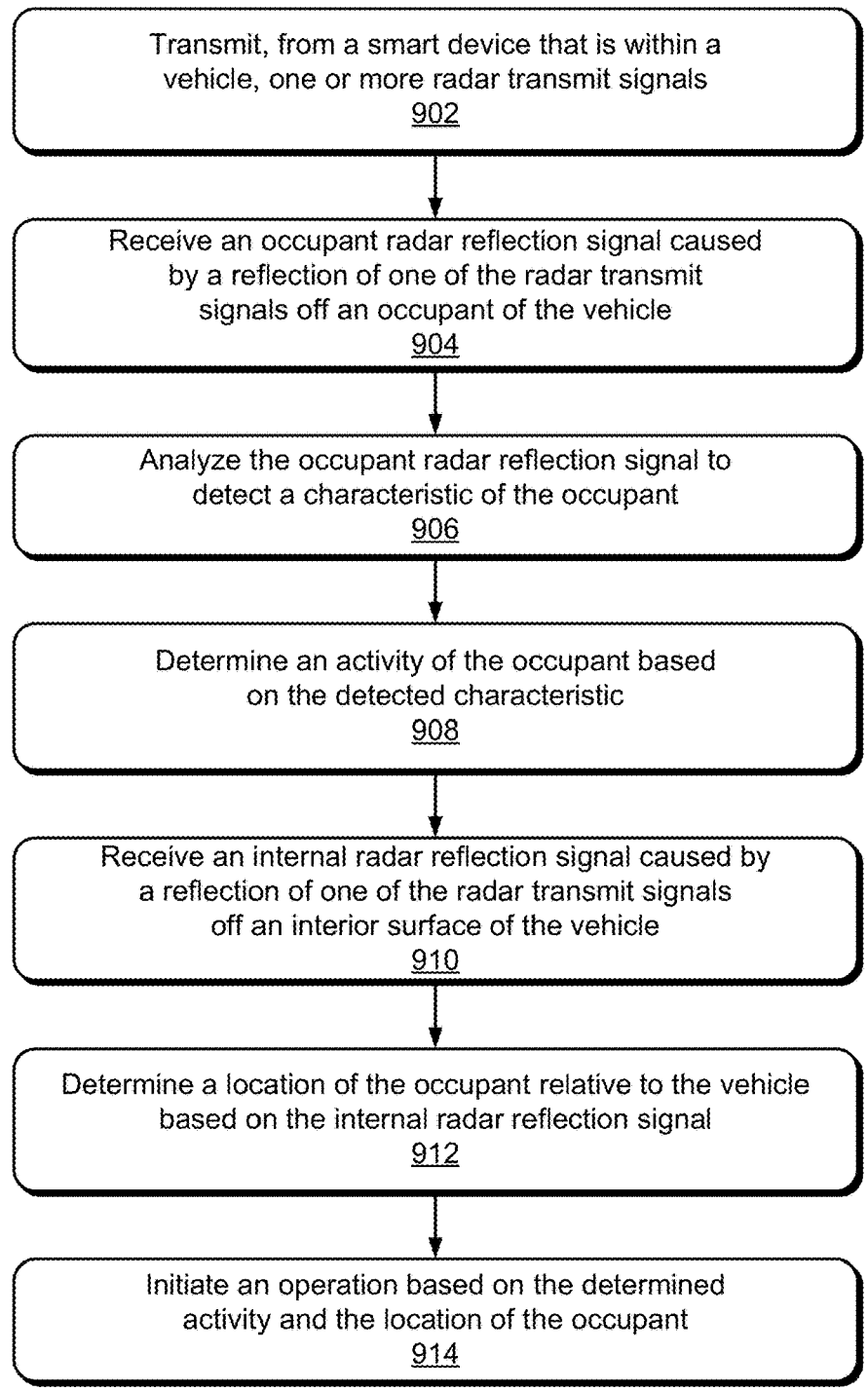
FIG. 9 illustrates an example method for performing operations of a smart-device-based radar system capable of detecting information about occupants within a vehicle.

FIG. 9 depicts an example method 900 for performing operations of a smart-device-based radar system capable of occupant detection and tracking within a vehicle.

At 902, a smart device transmits one or more radar transmit signals from an interior of a vehicle. For example, the smart device 102 may be mounted somewhere on a dash or a-pillar of the vehicle such that the radar transmit signals 502 can reach occupants (e.g. the driver 506 and the passenger 508), as shown in FIG. 5.

At 904, the smart device receives an occupant radar reflection signal caused by a reflection of one of the radar transmit signals off an occupant of the vehicle. For example, the occupant radar reflection signal may be reflected off a driver of the vehicle (e.g., radar reflection 512).

At 906, the occupant radar reflection signal is analyzed to detect a characteristic of the occupant. For example, the characteristic may be a gaze direction, facial expression, a determination of open or closed eyes, or simply a presence of the occupant.

At 908, an activity of the occupant is determined based on the detected characteristic. For example, the determined activity may be that the occupant is not paying attention to the road or that the occupant has a healthy heartbeat or respiratory rate.

At 910, the smart device receives an internal radar reflection signal caused by a reflection of one of the radar transmit signals off an interior surface of the vehicle. The internal radar reflection signal may be a reflection of a same radar transmit signal that caused the occupant radar reflection signal or a reflection of a different radar transmit signal (e.g., transmitted prior to, after, or based on a different modulation scheme). For example, the internal radar reflection signal may contain a reflection from a seat (e.g., radar reflection 510) or a steering wheel. In some embodiments, the internal radar reflection signal may come from a portion of the exterior of the vehicle, e.g., a side mirror, hood ornament, hood, or quarter-panel.

At 912, the smart device determines a location of the occupant relative to the vehicle based on the internal radar reflection signal. For example, the smart device may determine that the occupant is the driver 506, the passenger 508, or a child in a car seat. The determination may be made in conjunction with other sensors of the smart device (e.g., accelerometer, inclinometer, or gyroscope). The determination may utilize a pre-defined vehicle map that is either selected from a library or user created or be based on detected objects near the occupant, e.g., steering wheel or car seat.

At 914, an operation is initiated based on the determined activity and the location of the occupant. For example, some determined activities may only apply to a driver of the vehicle (eyes on the road, paying attention to driving, etc.) where other activities such as being alive may apply to any occupant position. The operation may involve alerting the occupant (e.g., visually, auditorily, through a haptic device, through a sound system of the vehicle) or automatically contacting emergency services (e.g., if a crash is detected or if a heartbeat is not detected). As another example, an alert may also be generated if a driver of the vehicle leaves the vehicle while there is still a child in a child seat in the vehicle.

Figure 10:
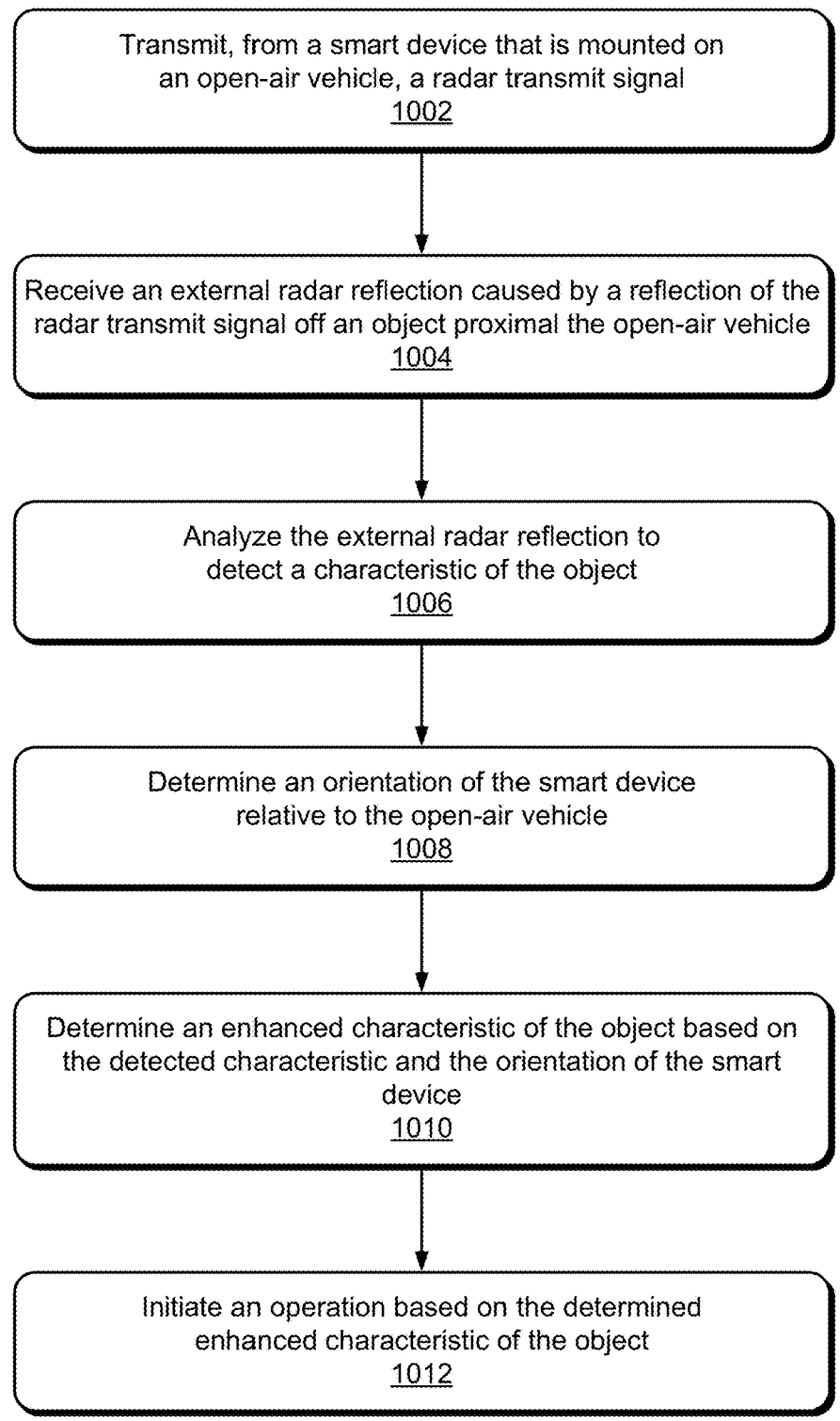
FIG. 10 illustrates an example method for performing operations of a smart-device-based radar system capable of detecting information about objects within a vicinity of an open-air vehicle.

FIG. 10 depicts an example method 1000 for performing operations of a smart-device-based radar system capable of characterizing objects proximal an open-air vehicle.

At 1002, a smart device transmits a radar transmit signal while mounted on an open-air vehicle. The open-air vehicle may be any form of vehicle such as a bicycle, recumbent bike, quad-cycle, all-terrain vehicle, motorcycle with or without a windscreen, scooter, moped, rickshaw, golf cart, go-cart, e-bike, tricycle, or any other small vehicle for which vehicle extents may be of little concern. For example, the smart device 102 may be mounted somewhere on a handlebar of a bicycle such that the radar transmit signal 602 can reach external objects (e.g. the external vehicle 608), as shown in FIG. 6.

At 1004, the smart device receives an external radar reflection signal caused by a reflection of the radar transmit signal off an object external to the rider/open-air vehicle.

At 1006, the external radar reflection signal is analyzed to detect a characteristic of the object. The characteristic may contain an identification of the object (e.g., 608 as an automobile and 610 as a tree) or a distance, heading, or speed of the object relative the smart device.

At 1008, the smart device determines an orientation of the smart device relative to the rider, open-air vehicle, or ground. The determination may be based on a radar reflection (e.g., from ground, rider, or open-air vehicle) and/or based on data from other sensors of the smart device (e.g., accelerometer, inclinometer, or gyroscope).

At 1010, an enhanced characteristic of the object is determined based on the characteristic of the object and the determined orientation of the smart device. For example, the smart device may determine that the object is 10 meters away and generally in a path of the open-air vehicle.

At 1012, an operation is initiated based on the enhanced characteristic of the object. The operation may involve displaying the enhanced characteristic on a display screen of the smart device, generating and presenting a notification or warning if the enhanced characteristic meets or exceeds certain thresholds (e.g., a collision may be imminent), displaying the enhanced characteristic along with one or more representations of the rider or open-air vehicle, and so on.

Conclusion

Although techniques using, and apparatuses including a smart-device-based radar system in a vehicle environment have been described in language specific to features and/or methods, it is to be understood that the subject of the appended claims is not necessarily limited to the specific features or methods described. Rather, the specific features and methods are disclosed as example implementations of smart-device-based radar system in a vehicle environment.

What is claimed is:

1. A mobile smart device comprising:
   a radar system comprising:
      one or more antennas;
      at least one transceiver coupled to the antennas and configured to:
         transmit, via one or more of the antennas, radar transmit signals; and
         receive, via one or more of the antennas, radar reflection signals;
      at least one processor; and
      at least one computer-readable storage media comprising processor-executable instructions that, responsive to execution by the processor, cause the mobile smart device to perform operations comprising:
      transmitting, via the radar system and while the mobile smart device is within an interior of a vehicle, one or more radar transmit signals;
      receiving, via the radar system:
         an internal radar reflection signal caused by a reflection of one of the radar transmit signals off a portion of the vehicle; and
         an external radar reflection signal caused by a reflection of one of the radar transmit signals off an object that is not the portion of the vehicle, another portion of the vehicle, or an occupant within the vehicle;
      estimating a position of the mobile smart device relative to the vehicle based on the internal radar reflection signal;
      analyzing the external radar reflection signal to determine a characteristic of the object;
      determining, based on the estimated position of the mobile smart device relative to the vehicle and the characteristic of the object, an enhanced characteristic of the object; and
      initiating an operation based on the enhanced characteristic of the object.

2. The mobile smart device of claim 1, wherein the internal radar reflection signal and the external radar reflection signal are caused by respective reflections of a same radar transmit signal.

3. The mobile smart device of claim 1, wherein:
   the internal radar reflection signal is caused by a reflection of a first radar transmit signal,
   the external radar reflection signal is caused by a reflection of a second radar transmit signal, and
   the second radar transmit signal based on the internal radar reflection signal.

4. The mobile smart device of claim 1, wherein the characteristic of the object comprises:
   an identification of the object;
   a distance to the object;
   a direction to the object relative the mobile smart device; or
   a relative velocity between the object and the mobile smart device.

5. The mobile smart device of claim 1, wherein the external radar reflection signal is differentiated from the internal radar reflection signal based on:
   a size, shape, speed, or distance of the object; or
   attenuation information in the external radar reflection signal indicating that the external radar reflection signal passed through a windshield or window of the vehicle.

6. The mobile smart device of claim 1, wherein the operations further comprise determining at least one extent of the vehicle relative to the mobile smart device based on:
   the estimated position of the mobile smart device relative to the vehicle; and
   a predetermined spatial profile of the vehicle.

7. The mobile smart device of claim 6, wherein the predetermined spatial profile of the vehicle is one of a plurality of predetermined spatial profiles corresponding to respective vehicle models.

8. The mobile smart device of claim 6, wherein the predetermined spatial profile is user created via the radar system.

9. The mobile smart device of claim 6, wherein the enhanced characteristic of the object comprises at least one of:
   a direction to the object relative to the vehicle; and
   a distance between the object and the extent of the vehicle.

10. The mobile smart device of claim 9, wherein the operation comprises displaying the enhanced characteristic of the object on a display screen of the mobile smart device in relation to a representation of the vehicle.

11. The mobile smart device of claim 1, wherein the at least one computer-readable storage media further comprises processor-executable instructions that, responsive to execution by the processor, cause the mobile smart device to periodically determine its position relative to the vehicle to update the estimated position, whereby the mobile smart device can be moved around the interior of the vehicle when determining the enhanced characteristic of the object.

12. A mobile smart device configured to be mounted on or in an open-air vehicle, the mobile smart device comprising:
   a radar system comprising:
      one or more antennas; and
      at least one transceiver coupled to the antennas and configured to:
         transmit, via at least one of the antennas and at a time that the mobile smart device is mounted to the open-air vehicle, a radar transmit signal; and
         receive, via at least one of the antennas and at a time that the mobile smart device is mounted to the open-air vehicle, radar reflection signals, the radar reflection signals comprising:
            an external radar reflection signal caused by a reflection of the radar transmit signal off an object within a proximity of the open-air vehicle; and
            an open-air vehicle radar reflection signal caused by a reflection of the radar transmit signal off of the open-air vehicle, off of a rider of the open-air vehicle, or off of both the open-air vehicle and the rider of the open-air vehicle;

at least one processor; and at least one computer-readable storage media comprising processor-executable instructions that, responsive to execution by the processor, cause the mobile smart device to:

distinguish the external radar reflection signal from the open-air vehicle radar reflection signal;

analyze the external radar reflection signal to detect at least one characteristic of the object; and initiate an operation based on the characteristic of the object.

13. The mobile smart device of claim 12, wherein the characteristic of the object comprises:

an identification of the object;

a direction to the object based on a determined orientation of the mobile smart device;

a distance to the object; or a relative velocity between the object and the mobile smart device.

14. The mobile smart device of claim 12, wherein the mobile smart device is configured to track, based on analyzing the external radar reflection signal, automobiles approaching the open-air vehicle from the rear.

15. The mobile smart device of claim 12, wherein:

the open-air vehicle radar reflection signal is caused by the reflection of the radar transmit signal off of the open-air vehicle; and the processor-executable instructions cause the mobile smart device to:

estimate a position of the mobile smart device relative to the open-air vehicle based on the open-air vehicle radar reflection signal;

determine, based on the estimated position of the mobile smart device relative to the open-air vehicle and the characteristic of the object, an enhanced characteristic of the object; and initiate the operation based on the enhanced characteristic of the object.

16. The mobile smart device of claim 15, wherein the processor-executable instructions cause the mobile smart device to:

determine, based on the open-air vehicle radar reflection signal, an orientation of the mobile smart device relative to the open-air vehicle; and determine the enhanced characteristic of the object based on the detected characteristic and the orientation of the mobile smart device.

17. The mobile smart device of claim 12, wherein the radar system is configured to transmit the radar transmit signal and receive the radar reflection signals during a same time interval.

18. A method performed by a mobile smart device comprising a radar system, the method comprising:

transmitting, via the radar system, a radar transmit signal, the mobile smart device being within an interior of a vehicle at a time the radar transmit signal is transmitted;

receiving, via the radar system:

an internal radar reflection signal caused by a reflection of the radar transmit signal off a portion of the vehicle; and an external radar reflection signal caused by a reflection of the radar transmit signal off an object that is not the portion of the vehicle, another portion of the vehicle, or an occupant within the vehicle;

estimating a position of the mobile smart device relative to the vehicle based on the internal radar reflection signal;

analyzing the external radar reflection signal to determine a characteristic of the object;

determining, based on the estimated position of the mobile smart device relative to the vehicle and the characteristic of the object, an enhanced characteristic of the object; and initiating an operation based on the enhanced characteristic of the object.

19. The method of claim 18, wherein the external radar reflection signal penetrates a windshield of the vehicle.

20. The method of claim 18, further comprising:

estimating a new position of the mobile smart device relative to the vehicle, wherein the new position of the mobile smart device is a position of the device after the device has been moved relative to the vehicle and determining the enhanced characteristic of the object is based on the new position.

* * * * *